United States Patent
Craig

(10) Patent No.: US 9,269,474 B2
(45) Date of Patent: Feb. 23, 2016

(54) BUS BAR INSULATOR

(71) Applicant: TYCO ELECTRONICS CORPORATION, Berwyn, PA (US)

(72) Inventor: Evan Lawrence Craig, Vernon Hills, IL (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 221 days.

(21) Appl. No.: 13/742,399

(22) Filed: Jan. 16, 2013

(65) Prior Publication Data

US 2014/0196927 A1    Jul. 17, 2014

(51) Int. Cl.
| | |
|---|---|
| *H01B 17/00* | (2006.01) |
| *H02G 5/00* | (2006.01) |
| *H05K 1/02* | (2006.01) |
| *H05K 7/14* | (2006.01) |
| *H01B 3/00* | (2006.01) |
| *H02G 5/02* | (2006.01) |

(52) U.S. Cl.
CPC .. *H01B 3/00* (2013.01); *H02G 5/00* (2013.01); *H02G 5/025* (2013.01)

(58) Field of Classification Search
CPC ............. H02G 5/00; H02G 5/025; H01B 3/00
USPC ......... 174/68.2, 71 B, 2 B, 99 B, 149 B, 174, 174/535; 439/212, 587
See application file for complete search history.

(56) References Cited

U.S. PATENT DOCUMENTS

| | | | | |
|---|---|---|---|---|
| 1,813,200 | A | * | 7/1931 | Rogers ............................ 191/30 |
| 4,022,967 | A | * | 5/1977 | Bulanchuk .................... 174/156 |
| 4,129,354 | A | * | 12/1978 | Polimine ....................... 439/785 |
| 4,737,745 | A | | 4/1988 | Doepker |
| 4,822,951 | A | * | 4/1989 | Wilson et al. ................ 174/68.2 |
| 5,008,494 | A | * | 4/1991 | Wagener ...................... 174/68.2 |
| 5,181,165 | A | * | 1/1993 | Gehrs et al. ................... 361/637 |
| 5,211,585 | A | * | 5/1993 | Douty et al. .................. 439/680 |

(Continued)

FOREIGN PATENT DOCUMENTS

| | | |
|---|---|---|
| DE | 10 2005 013509 A1 | 10/2005 |
| DE | 10 2008 023879 A1 | 11/2009 |

(Continued)

OTHER PUBLICATIONS

"DC EMC/EMI Filter for PV Inverters", Schaffner, 4 pgs, Jan. 2011.

(Continued)

*Primary Examiner* — Sherman Ng

(57) ABSTRACT

An assembly through which at least one bus bar extends includes bus bar-mounting openings. Insulators are positioned at each of the insulator-mounting openings. Each insulator includes a mounting member having contoured edges. A bus bar holding opening extends through the mounting member. Mounting openings are provided on the mounting member. The mounting openings being dimensioned to receive mounting hardware therein. The mounting openings are offset from the geometrical centerline of the bus-bar holding opening by more than the radius of the mounting hardware. The mounting hardware of adjacent insulators may be thereby interleaved to allow for close placement of the insulators while maintaining required spacing to provide proper electrical insulation.

15 Claims, 3 Drawing Sheets

(56) References Cited

U.S. PATENT DOCUMENTS

| | | | | |
|---|---|---|---|---|
| 5,213,518 | A | * | 5/1993 | Weidler .................. 439/211 |
| 6,100,473 | A | * | 8/2000 | Wagener ................ 174/99 R |
| 6,218,913 | B1 | | 4/2001 | Pagenkopf |
| 6,781,818 | B2 | * | 8/2004 | Josten et al. ............... 361/611 |
| 7,399,194 | B1 | * | 7/2008 | Gilliam ..................... 439/263 |
| 7,449,635 | B2 | * | 11/2008 | Wiant ....................... 174/68.2 |
| 7,854,636 | B2 | * | 12/2010 | Gilliam ..................... 439/797 |
| 2002/0023769 | A1 | | 2/2002 | Pioch |
| 2004/0051600 | A1 | | 3/2004 | Begon et al. |

FOREIGN PATENT DOCUMENTS

| | | |
|---|---|---|
| FR | 2 633 439 A1 | 12/1989 |
| GB | 586 477 A | 3/1947 |

OTHER PUBLICATIONS

European Search Report, Mail Date Mar. 5, 2014, EP 14 15 1335, Application No. 14151335.8-1801.

* cited by examiner

BUS BAR INSULATOR

FIELD OF THE INVENTION

The present invention relates to assemblies and insulators for bus bars and particularly to supporting assemblies and insulators which provide proper electrical isolation in applications in which the size of the assembly must be minimized.

BACKGROUND OF THE INVENTION

Supporting insulators are useful when passing bus bars through a conductive enclosure of an electrical device or equipment, such as, but not limited to, a switch, filter or the like. Many of the supporting insulators that are currently available support multiple bus bars and offer limited geometry. Other non-conductive bus bar insulators, such as for example used by the Schaffner in their FN 2200 DC EMC/EMI Line Filter, use conductive fasteners to secure the insulators to the enclosure. The conductive fasteners that secure known non-conducive bus bar insulators to conductive enclosures encroach either on the spacing required between conductors of opposite polarity or on the hardware and size limits of the mounting panel. Consequently, the insulator flanges that accept the fasteners interfere with close placement of several adjacent insulators and/or the optimal location of the insulator and the bus bar it supports in the panel. In addition, known insulators provide no mechanical restraint to prevent axial movement of the supported bus bar, and require additional means to secure the bus bar.

Consequently, there is a need in the industry for an improved supporting insulator which minimizes the distance necessary between and beyond adjacent insulators while assuring that the required spacing between conductors of opposite polarity, which includes adjacent bus bars, insulator fasteners and a conductive panel, is provided. There is also a need for an insulator which includes features to restrict axial motion of the bus bar.

SUMMARY OF THE INVENTION

It is an object of this invention to obviate the above-described problems.

It is another object of this invention to provide a supporting insulator which minimizes the distance necessary between and beyond adjacent insulators while assuring that the required spacing between conductors of opposite polarity is provided.

It is another object of this invention to provide an insulator which includes features to restrict axial motion of the bus bar.

According to an embodiment, an insulator for electrically isolating the walls of an assembly and bus bars which extend through the assembly is provided. The insulator includes a mounting member having contoured edges. A bus bar-holding opening extends through the mounting member. Mounting openings are provided on the mounting member. The mounting openings being dimensioned to receive mounting hardware therein. The mounting openings are offset from the geometrical centerline of the bus bar-holding opening by more than the radius of the mounting hardware. The mounting hardware of adjacent insulators may be thereby interleaved to allow for close placement of the insulators while maintaining required spacing to provide proper electrical isolation.

According to an alternate embodiment, an assembly through which at least one bus bar extends is disclosed. The assembly includes a first mounting panel on one end and an oppositely facing second mounting panel on the opposite end, the first and second mounting panel having bus bar-receiving openings which extend therethrough. An insulator is positioned in each of the bus bar-receiving openings. Each insulator includes a contoured mounting member. A bus bar-holding opening extends through the mounting member. Axial engagement members are on the insulator. The axial engagement members cooperate with the at least one bus bar to restrict the axial movement of the at least one bus bar.

According to an alternate embodiment, an assembly through which at least one bus bar extends is disclosed. The assembly includes a first mounting panel on one end and an oppositely facing second mounting panel; with the first and second mounting panels having bus bar-receiving openings which extend therethrough. Insulators are positioned in each of the bus bar-receiving openings. Each insulator includes a mounting member, mounting openings, bus bar holding openings, and bus bar-engagement members. The mounting member having contoured edges. The mounting openings are offset from the geometrical centerline of the bus bar-holding opening by more than the radius of mounting hardware used to mount the insulator to a respective mounting panel of the assembly. The bus bar-holding opening extends through the mounting member. The bus bar engagement members are provided on the insulator proximate the bus bar receiving opening. The bus bar-engagement members are dimensioned to receive insulator engagement members provided on the at least one bus bar which is positioned in the bus bar-holding opening. The mounting hardware of adjacent insulators are interleaved to allow for close spacing of the insulators while maintaining proper spacing to provide the electrical insulation required for the at least one bus bar.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
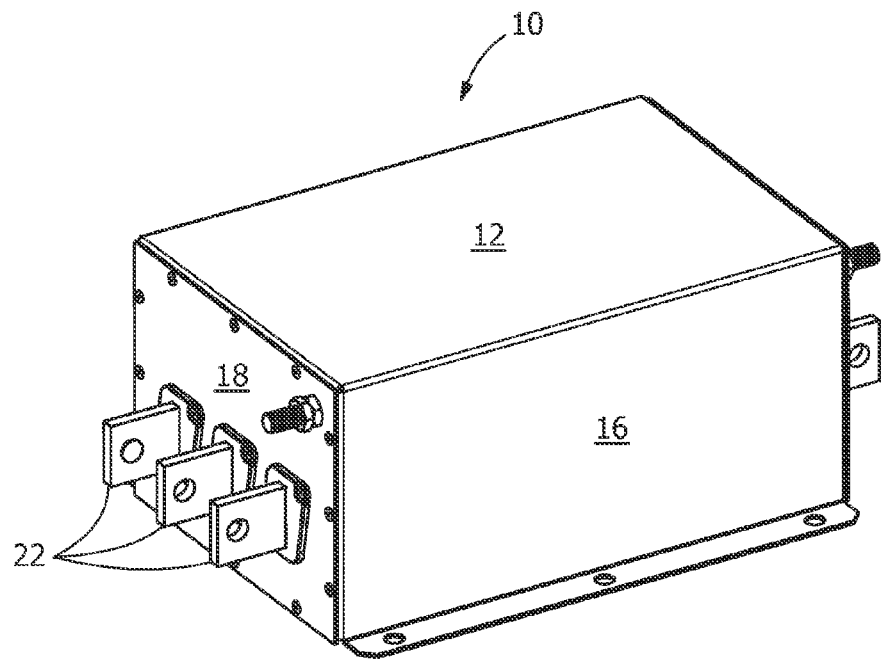
FIG. 1 is a perspective view of an illustrative assembly in which a bus bar insulator is inserted.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "upper", "lower" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

The present invention is directed to an insulator for use with bus bars and the like, the insulator minimizes the distance necessary between and beyond adjacent insulators to assure the required spacing between conductors of opposite polarity, such as, but not limited to, adjacent bus bars, the insulator fasteners and the conductive panel. Additionally, the insulator includes features to engage features on or in the bus bar to restrict axial motion of the bus bar.

Figure 2:
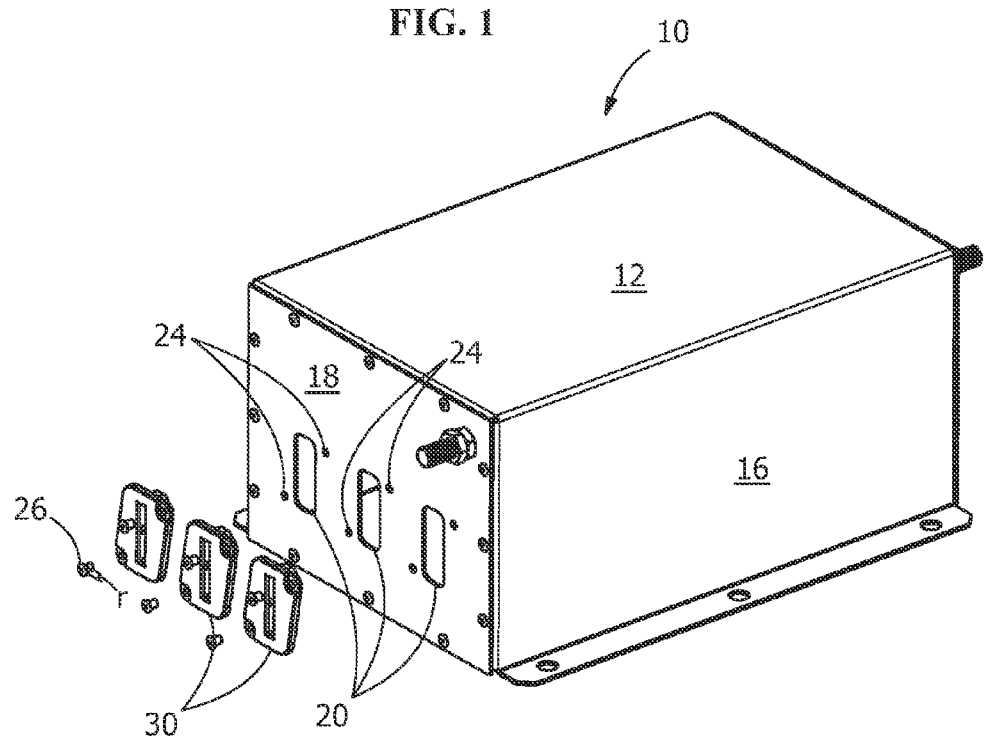
FIG. 2 is a perspective view of a front wall of the assembly of FIG. 1, showing three bus bar insulators exploded from openings of the front wall of the assembly, the fasteners are enlarged for purposes clarity.

Referring to FIGS. 1 and 2, an illustrative assembly 10 is illustrated. The assembly 10 may be any device through which bus bars or the like are provided. Such assemblies include, but are not limited to filters, switches and the like.

The assembly 10 has a top wall 12, a bottom wall (not shown) and side walls 16 which extend between the top wall 12 and the bottom wall. A front wall or mounting panel 18 and a back wall or mounting panel (not shown) extend between the top wall 12 and the bottom wall and extend between the side walls 16. As front wall 18 and back wall are essentially similar, only front wall 18 will be described in more detail. However, the description of the front wall 18 is equally applicable to the back wall. The walls are made from electrically conductive material to provide shielding to the components used in the assembly 10, as is known in the industry.

Contained inside the assembly 10 are the various components need for proper operation of the assembly. For example, if the assembly 10 is a filter, capacitors, resistors and the like are provided in the interior of the assembly 10.

As best shown in FIG. 2, bus bar-receiving openings 20 extend through front wall 18. In the illustrative embodiment shown, three openings 20 are shown, but any number can be provided without departing from the scope of the invention. The openings 20 are dimensioned to receive insulators 30 and bus bars 22 (FIG. 1) therethrough. Fastener receiving openings 24 are offset from the geometrical centerline of the bus bar 22 by more than the radius r of a fastener 26 which is received in a respective opening 24, as will be more fully described below. In the embodiment shown, the openings 24 are located in diagonally opposite corners relative to the openings 20.

Figure 3:
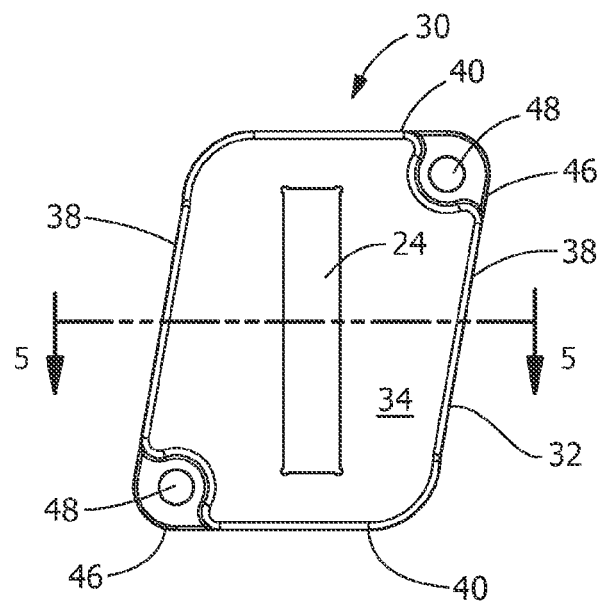
FIG. 3 is a front view of an illustrative bus bar insulator of the type shown in FIG. 1.
Figure 4:
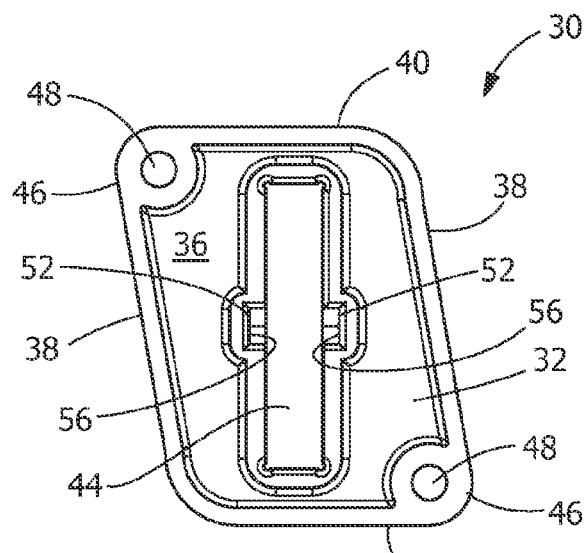
FIG. 4 is a rear view of the illustrative bus bar insulator of FIG. 3.
Figure 5:
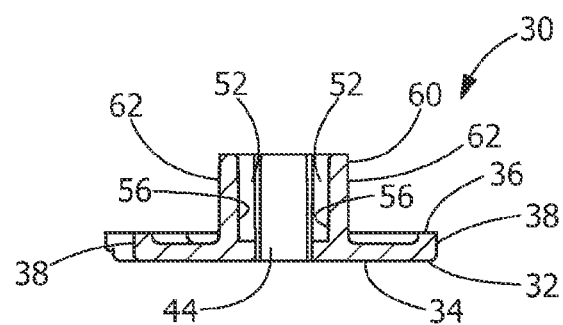
FIG. 5 is a cross-sectional view of the illustrative bus bar insulator taken along line 5-5 of FIG. 3.
Figure 6:
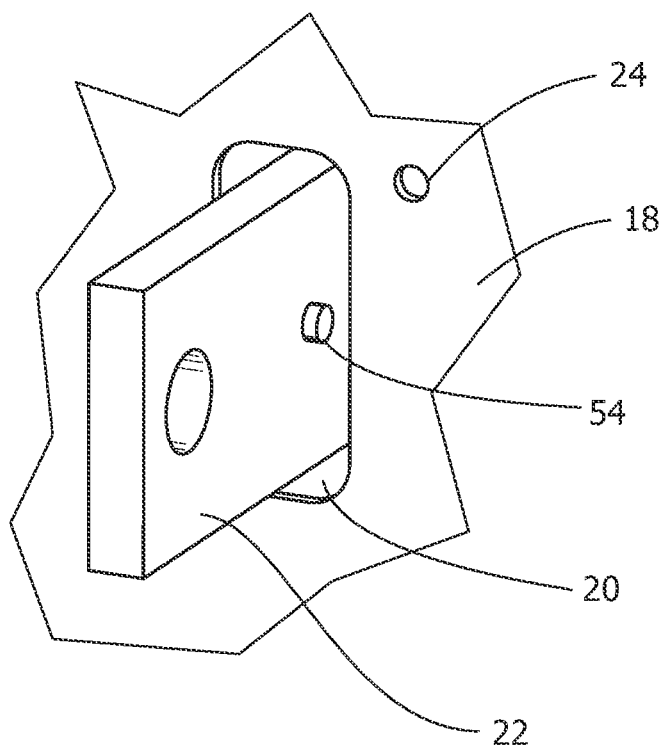
FIG. 6 is a partial perspective view of a bus bar as positioned in an opening of the bus bar insulator of FIG. 3.

Referring to FIGS. 3 through 5, an insulator 30 is shown. The insulator 30 has a contoured mounting plate or member 32 with a first surface 34 and an oppositely facing second surface 36. Side walls 38 and end walls 40 form a contoured edge which extends between the first surface 34 and the second surface 36. In the illustrative embodiment shown, the side walls 38 extend in a direction which is essentially parallel to each other and the end walls 40 extend from the side walls 38 at an angle other than 90 degrees. The end walls 40 also extend in a direction which is essentially parallel each other. While the side walls and end walls are described with respect to the embodiment shown, the mounting member 32 may have any type of contoured edge with any arbitrary shape so long as the mounting member 32 interleaves diagonally with adjacent mounting members 32. In various embodiments, the mounting member 32 has two fold rotational symmetry, including substantially straight sides that are non-perpendicular to a line which extends through the rotational center of the mounting member 32. Alternatively, in other embodiments, the mounting member 32 has two fold rotational symmetry, including substantially straight sides that are perpendicular to the line through the rotational center that connects them.

A bus bar holding opening 44 extends through the mounting member 32. The opening 44 is dimensioned to be smaller than a respective opening 20.

Figure 7:
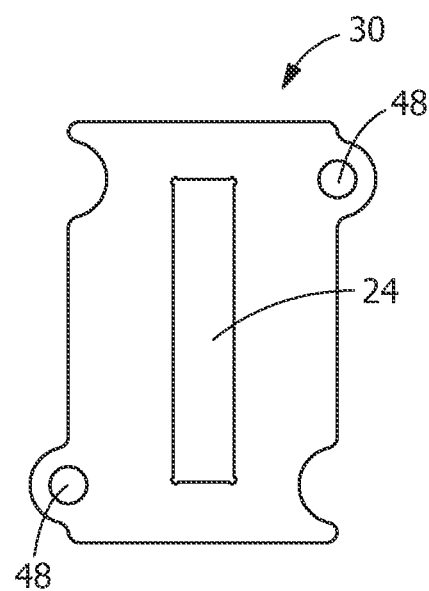
FIG. 7 is a front view of an alternate illustrative bus bar insulator.

In the embodiment shown in FIG. 3, mounting flanges 46 are provided on the mounting member 32. The mounting flanges extend from proximate the opening 44 toward the intersection of a respective side wall 38 and a respective end wall 40. The flanges 46 are located or formed in diagonally opposite corners of the mounting member 32. Mounting openings 48 are provided in each mounting flange 46. The openings 48 are dimensioned to receive the mounting hardware or fasteners 26, such as, but not limited to, rivets or screws therein. The openings 48 are offset from the geometrical centerline of the opening 44 or the bus bar by more than the radius r of the respective fastener 26 positioned in the openings 48. The openings 48 align with openings 24 to allow the fasteners 26 to be properly mounted through openings 48 and into openings 24 to secure the insulator 30 to the respective front or back wall of the assembly 10. However, other embodiments may be used without departing from the invention. In general, the mounting flanges 46 are areas of the mounting members 32 which are intended to receive and support fasteners 26. The mounting flanges 46 need not be tangent with adjoining edges of the mounting members 32 nor geometrically distinct. FIG. 7 illustrates an alternate embodiment of the mounting flanges 46 and mounting member 32.

As best shown in FIGS. 4 and 5, axial engagement members or bus bar engagement members, such as, but not limited to, cutouts or recesses 52 are provide proximate openings 48. The recesses 52 are dimensioned to receive insulator engagement members, such as, but not limited to, projections 54 provided on the bus bars 22. In the illustrative embodiment shown, the projections 54 of the bus bars 22 engage a surface 56 of the recesses 52 to restrict axial motion of the bus bars 22 in one direction. Such engagement may be accomplished by, but is not limited to, frictional engagement or adhesive-bonding. The use of such insulators 30, which restrict axial motion in one direction, on opposite ends of the assembly 10 completely restrain the bus bars 22 and prevents axial movement of the bus bars 22 relative to the assembly 10. While the illustrative embodiment shows recesses 52 on the insulators 30 and a projection 54 on the bus bars 22, other configuration can be used without departing from the scope of the invention. For example, the insulator 30 may include pockets or protrusions to capture, partially capture or cooperate with a feature developed or inserted into the bus bars 22, such as, but not limited to a recess, thereby restraining axial motion of the bus bars 22 in at least one direction relative to the insulator 30 and the assembly 10. Additionally, the bus bar engagement member and/or the insulator engagement members may be independent components which are cooperate with the bus bars 22 to restrict axial motion of the bus bars 22.

As shown in FIG. 5, in one embodiment an insulating sleeve or projection 60 having insulating walls 62 may extend from the second surface 36 of the mounting member 32 of each insulator 30 in a direction away from the first surface 34. Alternatively, or in addition to, the insulating projection 60 may extend from the first surface 34 in a direction away from the second surface 36. The opening 44 extends from the mating member 32 through the insulating projection 60. The insulating walls or sleeves 62 have a length sufficient to extend beyond the thickness of the front or back wall of the assembly 10, thereby providing sufficient insulation between the walls of the assembly 10 and the bus bars 22 which extend through the openings 44. In various embodiments, the insulating projection 60 is not required and may be omitted.

During assembly of the assembly 10, the bus bars 22 are positioned and attached to respective components (not shown). The walls of the assembly 10 are moved into position and secured. As the front wall or mounting panel and/or back wall or mounting panel are moved into position, the ends of the bus bars 22 are inserted through respective openings 20. With the bus bars 22 properly positioned in the opening 20, the insulators 30 are inserted on the ends of the bus bars 22, such that the ends of the bus bars 22 are positioned in openings 44. Insertion of each of the insulators 30 continues until the second surface 36 of the mounting member 32 engages a respective mounting panel of the assembly proximate the opening 20. In this position, the insulating walls or sleeves 62 may be inserted through opening 20, thereby electrically and physically separating bus bars 22 from the mounting panel of the assembly 10.

Fasteners 26 are inserted through openings 44 of the mounting flange 46 of the mounting member 32 and into openings 24 of the front or back mounting panel to properly secure the insulator 30 to the respective mounting panel.

Alternatively, the insulators may be positioned on the bus bars 22 prior to some or all of the walls of the assembly 10 being moved into position and secured. In this embodiment, the insulators 30 are captured between the front panel 18 and the back panel. With the bus bars 22 properly positioned in the opening 20, the insulators 30 are moved such that the first surfaces 34 of the mounting members 32 engage a respective mounting panel of the assembly proximate the opening 20. In this position, the insulating walls or sleeves 62 may be inserted through opening 20, thereby electrically and physically separating bus bars 22 from the mounting panel of the assembly 10. Fasteners 26 are inserted through openings 24 of the front or back mounting panel into openings 44 of the mounting flange 46 of the mounting member 32 to properly secure the insulator 30 to the respective mounting panel. Other methods of inserting the fasteners can be used without departing from the scope of the invention.

As previously stated, the mounting openings 48 are offset from the geometrical centerline of the opening 44 and/or the geometric centerline of the bus bar 22 positioned in the opening by more than the radius r of the fastener 26. This geometry allows the fastener locations to interleave transversely in the direction of an adjacent insulator 30, while remaining sufficiently distant from the bus bar 22 supported by the adjacent insulator 30. This allows for the close placement of adjacent insulators 30 and bus bars 22, providing appropriate electrical insulation between the bus bars 22 and the assembly 10, while limiting the amount of space required for the insulators 30 and its mounting hardware or fasteners 26. In application in which the size of all components must be minimized, the configuration of the insulator 30 described herein is advantageous.

With each insulator 30 properly mounted, the axial engagement members or surface 56 of the insulator 30 is provided proximate to or in engagement with the projections 54 of the bus bar 22. The cooperation of the surface 56 with the projection 54 prohibits the projection 54 from moving beyond the surface 56, thereby restraining axial motion of the bus bar 22 in at least one direction. Use of such insulators 30 on opposite ends of the assembly 10 completely restrains or limits the bus bar 22 from movement relative to the assembly 10 in the axial direction of the bus bar.

The mounting member 32 and the insulating sleeve or projection 60 are optionally relieved to improve manufacturability by injection molding, while preserving strength and aesthetics, and reducing material usage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An insulator for providing insulation between walls of an assembly and a bus bar which extends through the assembly, the insulator comprising:
   a contoured mounting member having a contoured edge, the contoured edge having side walls and end walls, the side walls extend in a direction which is essentially parallel to each other and which is non-perpendicular to a line which extends through a rotational center of the mounting member, the end walls extend from the side walls at an angle other than 90 degrees, the end walls extend in a direction which is essentially parallel each other;
   a bus bar-holding opening extending through the mounting member;
   mounting flanges provided on the mounting member, the mounting flanges extend from proximate the bus bar-holding opening to diagonally opposed corners of the mounting member;
   mounting openings provided on the mounting flanges of the mounting member, the mounting openings being offset from the geometrical centerline of the bus bar-holding opening by more than the radius of the mounting hardware;
   the contoured mounting member has twofold rotational symmetry;
   whereby the mounting hardware of the insulator and mounting hardware of an adjacent insulator may be interleaved transversely in the direction of the adjacent insulator having two-fold rotational symmetry to allow for close placement of the insulators while maintaining required spacing to provide proper electrical isolation.

2. The insulator as recited in claim 1, wherein an insulating projection has first insulating walls extending from a second surface of the mounting member, the bus bar-holding opening extending from the mating member through the insulating projection.

3. The insulator as recited in claim 2, wherein second insulating walls of the insulating projection extend from the first surface of the mounting member in a direction away from the first insulating walls.

4. The insulator as recited in claim 1, wherein axial engagement members are provided on the insulator, the axial engagement members cooperate with the bus bar to restrict the axial motion of the bus bar relative to the insulator.

5. The insulator as recited in claim 4, wherein the axial engagement members of the insulator are recesses which engage interlocking components of the bus bar.

6. The insulator as recited in claim 4, wherein the axial engagement members of the insulator are projections which engage recesses of the bus bar.

7. The insulator as recited in claim 4, wherein the axial engagement members are provided on an insulating projection which extends from a surface of the mounting member.

8. An insulator for providing insulation between walls of an assembly and a bus bar which extends through the assembly, the insulator comprising:
- side walls and end walls, the side walls extend in a direction which is essentially parallel to each other and which is non-perpendicular to a line which extends through a rotational center of a mounting member, the end walls extend from the side walls at an angle other than 90 degrees, the end walls extend in a direction which is essentially parallel each other;
- a bus bar-holding opening extending through the mounting member;
- axial engagement members provided on the insulator, the axial engagement members cooperating with the bus bar to restrict the axial motion of the bus bar relative to the mounting member;
- mounting flanges extending from proximate the bus bar-holding opening, the flanges formed in diagonally opposed corners of the mounting member, mounting openings being provided in each mounting flange;
- the mounting openings being offset from the geometrical centerline of the bus bar-holding opening by more than the radius of the mounting hardware;
- the mounting member has two-fold rotational symmetry;
- whereby as the side walls are non-perpendicular to a line which extends through the rotational center of the mounting member, the mounting hardware of the insulator and mounting hardware of an adjacent insulator may be interleaved transversely in the direction of the adjacent insulator having twofold rotational symmetry to allow for close placement of the insulators while maintaining required spacing to provide proper electrical isolation.

9. The insulator as recited in claim 8, wherein an insulating projection has first insulating walls extending from a second surface of the mounting member, the bus bar-holding opening extending from the mating member through the insulating projection.

10. The insulator as recited in claim 9, wherein second insulating walls of the insulating projection extend from the first surface of the mounting member in a direction away from the first insulating walls.

11. The insulator as recited in claim 8, wherein the axial engagement members of the insulator are recesses which engage interlocking components of the bus bar.

12. The insulator as recited in claim 8, wherein the axial engagement members of the insulator are projections which engage recesses of the bus bar.

13. An insulator for providing insulation between walls of an assembly and a bus bar which extends through the assembly, the insulator comprising:
- a contoured mounting member having a contoured edge, the contoured edge having side walls and end walls, the side walls extend in a direction which is non-perpendicular to a line which extends through a rotational center of the mounting member;
- a bus bar-holding opening extending through the mounting member;
- axial engagement members are provided on the insulator, the axial engagement members cooperate with the bus bar to restrict the axial motion of the bus bar relative to the insulator;
- mounting flanges provided on the mounting member, the mounting flanges extend from proximate the bus bar-holding opening to diagonally opposed corners of the mounting member;
- mounting openings provided on the mounting flanges of the mounting member, the mounting openings being offset from the geometrical centerline of the bus bar-holding opening by more than the radius of the mounting hardware;
- the mounting member has two-fold rotational symmetry;
- whereby as the side walls are non-perpendicular to a line which extends through the rotational center of the mounting member, the mounting hardware of the insulator and mounting hardware of an adjacent insulator having twofold symmetry may be interleaved transversely in the direction of the adjacent insulator to allow for close placement of the insulators while maintaining required spacing to provide proper electrical isolation.

14. The insulator as recited in claim 13, wherein the axial engagement members of the insulator are recesses which engage interlocking components of the bus bar.

15. The insulator as recited in claim 13, wherein the axial engagement members of the insulator are projections which engage recesses of the bus bar.

* * * * *